(12) United States Patent
Nakamoto et al.

(10) Patent No.: US 11,063,543 B2
(45) Date of Patent: Jul. 13, 2021

(54) ELECTRIC WORKING MACHINE AND VOLTAGE SUPPLIER

(71) Applicant: MAKITA CORPORATION, Anjo (JP)

(72) Inventors: Akihiro Nakamoto, Anjo (JP); Hitoshi Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 87 days.

(21) Appl. No.: 16/531,519

(22) Filed: Aug. 5, 2019

(65) Prior Publication Data

US 2020/0067337 A1 Feb. 27, 2020

(30) Foreign Application Priority Data

Aug. 22, 2018 (JP) .............................. JP2018-155432

(51) Int. Cl.
*A01G 20/47* (2018.01)
*H02P 27/06* (2006.01)
*H02J 7/00* (2006.01)

(52) U.S. Cl.
CPC .............. *H02P 27/06* (2013.01); *A01G 20/47* (2018.02); *H02J 2007/0067* (2013.01); *H02J 2207/20* (2020.01)

(58) Field of Classification Search
CPC ............ H02J 7/00; H02J 7/0024; H02J 7/022; H01M 10/00; H01M 10/4207; H01M 10/4214; H01M 10/4221; H01M 10/441; H01M 10/0445; H01M 2/1022; H01M 2/1033; H01M 2220/30; H02P 29/00; H02P 25/14

See application file for complete search history.

(56) References Cited

U.S. PATENT DOCUMENTS

| | | | | |
|---|---|---|---|---|
| 9,472,979 | B2 * | 10/2016 | Mergener | .............. H02J 7/0063 |
| 2012/0013304 | A1 * | 1/2012 | Murase | .................. B60L 58/21 |
| | | | | 320/116 |
| 2013/0025893 | A1 * | 1/2013 | Ota | ..................... H01M 10/482 |
| | | | | 173/2 |
| 2017/0346334 | A1 * | 11/2017 | Mergener | .................. H02J 9/06 |
| 2018/0152043 | A1 * | 5/2018 | Geng | .................... H02J 7/0013 |
| 2019/0367080 | A1 * | 12/2019 | Yamanaka | ........... B62D 5/0463 |

FOREIGN PATENT DOCUMENTS

WO 2011/129171 A1 10/2011

* cited by examiner

*Primary Examiner* — Eduardo Colon Santana
*Assistant Examiner* — Said Bouziane
(74) *Attorney, Agent, or Firm* — Oliff PLC

(57) ABSTRACT

A voltage supplier in one aspect of the present disclosure includes a first voltage generator, a second voltage generator, a first switcher, a second switcher, a first booster, and a second booster. The first booster boosts a voltage lower than a first switching drive voltage to thereby generate the first switching drive voltage, and supplies the first switching drive voltage to the first switcher on a first supply path. The second booster boosts a voltage lower than a second switching drive voltage to thereby generate the second switching drive voltage, and supplies the second switching drive voltage to the second switcher on a second supply path.

8 Claims, 7 Drawing Sheets

ELECTRIC WORKING MACHINE AND VOLTAGE SUPPLIER

CROSS-REFERENCE TO RELATED APPLICATIONS

This application claims the benefit of Japanese Patent Application No. 2018-155432 filed on Aug. 22, 2018 in the Japan Patent Office, the entire disclosure of which is incorporated herein by reference.

BACKGROUND

The present disclosure relates to a voltage supplier including voltage generators.

A voltage supplier disclosed in WO 2011/129171 is configured to select one battery from batteries coupled in parallel by using switching devices, and to discharge current from the selected battery.

SUMMARY

N-channel Metal Oxide Semiconductor Field Effect Transistors (MOSFETs) are often used as switching devices for a large discharge current. A gate driving voltage applied to a gate of an N-channel MOSFET must be higher than a voltage of a battery. Thus, a voltage supplier using the N-channel MOSFET needs to include booster circuit boosting the voltage of the battery to generate the gate driving voltage.

In the voltage supplier including the booster circuit, there is a possibility that charging may occur between batteries coupled in parallel due to differences in a charge amount (that is, a battery voltage) of each battery.

Preferably, one aspect of the present disclosure can reduce the occurrence of the charging between batteries.

An electric working machine in one aspect of the present disclosure includes: a motor; a motor driving circuit; a first supply path; a first booster circuit; a first battery switching circuit; a second supply path; a second booster circuit; and/or a second battery switching circuit. The motor driving circuit drives the motor. The first supply path supplies a first power supply voltage from a positive electrode of a first battery pack to the motor driving circuit. The first booster circuit receives the first power supply voltage from the first supply path, boosts the first power supply voltage, and generates a first boosted voltage. The first battery switching circuit includes a first switching device provided on the first supply path. The first switching device includes a first terminal coupled to the positive electrode of the first battery pack, and a second terminal coupled to the motor driving circuit. The first switching device electrically couples the positive electrode of the first battery pack to the motor driving circuit in response to the first switching device being turned ON. The first battery switching circuit turns ON the first switching device with the first boosted voltage in response to a first condition being established. The second supply path supplies a second power supply voltage from a positive electrode of a second battery pack to the motor driving circuit. The second booster circuit receives the second power supply voltage from the second supply path, boosts the second power supply voltage, and generates a second boosted voltage. The second battery switching circuit includes a second switching device provided on the second supply path. The second switching device includes a first terminal coupled to the second battery pack and a second terminal coupled to the motor driving circuit. The second switching device electrically couples the positive electrode of the second battery pack to the motor driving circuit in response to the second switching device being turned ON. The second battery switching circuit turns ON the second switching device with the second boosted voltage in response to a second condition being established.

In the electric working machine configured as described above, the first booster circuit reduces or inhibits a flow of electric current from the positive electrode of the second battery pack to the positive electrode of the first battery pack. The second booster circuit reduces or inhibits a flow of electric current from the positive electrode of the first battery pack to the positive electrode of the second battery pack. Therefore, it is possible to reduce or inhibit the charge between the first battery pack and the second battery pack in this electric working machine.

The electric working machine may further include a first charge inhibition circuit configured to electrically interrupt the first terminal of the first switching device from the positive electrode of the first battery pack in response to a voltage at the first terminal of the first switching device being larger than a voltage at the positive electrode of the first battery pack.

With the first charge inhibition circuit, it is possible to surely reduce or inhibit the charge of the first battery pack.

The first condition may be established in any ways. The first condition may be established in response to the following (i) to (iii) being satisfied:
(i) the first battery pack is normal;
(ii) an electric discharge from the first battery pack is permitted; and
(iii) there is no failure in the first battery switching circuit and the first charge inhibition circuit.

The electric working machine may include a second charge inhibition circuit configured to electrically interrupt the first terminal of the second switching device from the positive electrode of the second battery pack in response to a voltage at the first terminal of the second switching device being larger than a voltage at the positive electrode of the second battery pack.

With the second charge inhibition circuit, it is possible to surely reduce or inhibit the charge of the second battery pack.

The second condition may be established in any ways. The second condition may be established in response to the following (i) to (iii) being satisfied:
(i) the second battery pack is normal;
(ii) an electric discharge from the second battery pack is permitted; and
(iii) there is no failure in the second battery switching circuit and the second charge inhibition circuit.

The second terminal of the second switching device may be electrically coupled to the second terminal of the first switching device.

The first switching device and/or the second switching device may include an N-channel Metal Oxide Semiconductor Field Effect Transistor (MOSFET).

The first switching device and/or the second switching device may include an insulated gate bipolar transistor (IGBT).

A voltage supplier in another aspect of the present disclosure includes a first voltage generator, a second voltage generator, a first switcher, a second switcher, a first booster, and/or a second booster.

The first voltage generator generates a first power supply voltage to drive a drive source of the electric working machine. The second voltage generator generates a second power supply voltage to drive the drive source.

The first switcher is provided on a first supply path and switches the first supply path to an electrically interrupted state or an electrically coupled state. The first switcher is driven by a first switching drive voltage higher than the first power supply voltage. The first supply path is configured to supply the first power supply voltage from the first voltage generator to the drive source in the electrically coupled state. The second switcher is provided on a second supply path and configured to switch the second supply path to an electrically interrupted state or an electrically coupled state. The second switcher is driven by a second switching drive voltage higher than the second power supply voltage. The second supply path is configured to supply the second power supply voltage from the second voltage generator to the drive source in the electrically coupled state.

The first booster boosts a voltage lower than the first switching drive voltage to thereby generate the first switching drive voltage, and supplies the first switching drive voltage to the first switcher. The second booster boosts a voltage lower than the second switching drive voltage to thereby generate the second switching drive voltage, and supplies the second switching drive voltage to the second switcher.

In the voltage supplier configured as described above, the first booster supplies the first switching drive voltage to the first switcher, and the second booster supplies the second switching drive voltage to the second switcher. Thus, in the voltage supplier, it is possible to reduce or inhibit an electrical coupling between the first supply path and the second supply path through the first booster. Similarly, in the voltage supplier, it is possible to reduce or inhibit the electrical coupling between the second supply path and the first supply path through the second booster. Therefore, the voltage supplier can reduce or inhibit the occurrence of the charge from the first voltage generator to the second voltage generator, and the occurrence of the charge from the second voltage generator to the first voltage generator.

The first switcher and/or the second switcher may include an N-channel MOSFET. Alternatively, the first switcher and/or the second switcher may include an IGBT.

The first booster may generate the first switching drive voltage by boosting the first power supply voltage supplied from the first voltage generator. The second booster may generate the second switching drive voltage by boosting the second power supply voltage supplied from the second voltage generator.

In the voltage supplier as configured above, when the first voltage generator cannot generate the first power supply voltage, the second voltage generator can supply the second power supply voltage through the second supply path. In the voltage supplier, when the second voltage generator cannot generate the second power supply voltage, the first voltage generator can supply the first power supply voltage through the first supply path.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENT

Figure 1:
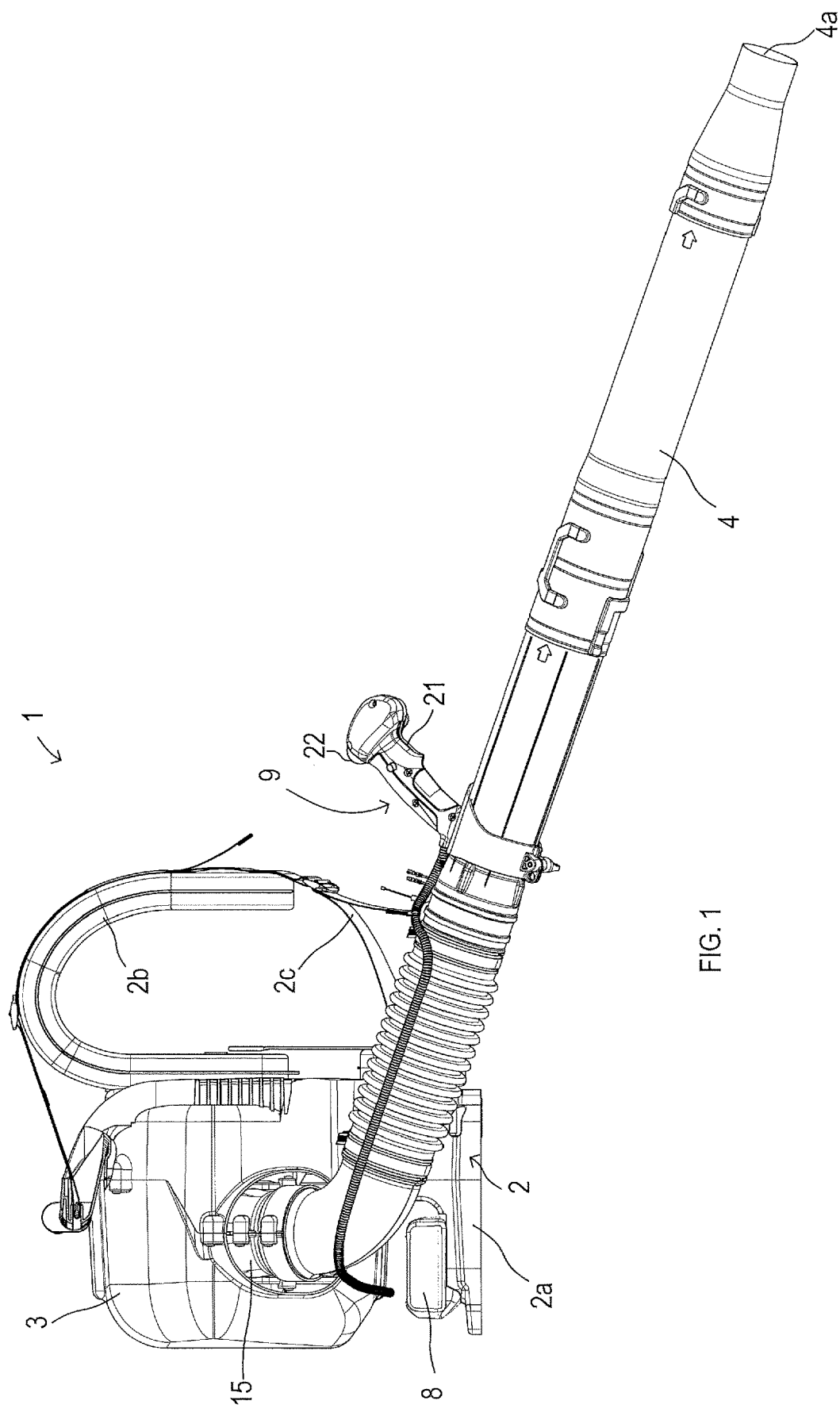
FIG. 1 is a view showing an overall configuration of a backpack-type blower.

As shown in FIG. 1, a backpack-type blower 1 (hereinafter, simply referred to as a blower 1) of the present embodiment includes a back carrier 2, a blower main body 3, and a pipe 4.

The back carrier 2 includes a loading portion 2a to load the blower main body 3, a shoulder pad 2b for user's shoulder, and a belt 2c. The blower main body 3 is attached to the loading portion 2a of the back carrier 2 and the blower main body 3 discharges air. The pipe 4 discharges the air came from the blower main body 3 through a discharge port 4a formed at a tip of the pipe 4.

The blower 1 further includes an operating portion 9 configured to be gripped by a user with one hand. The operating portion 9 is attached to an outer circumference of the pipe 4, and held and used by the user to adjust an orientation of the discharge port 4a.

The operating portion 9 includes operation switches to operate the blower 1 with a user's finger. Specifically, the operating portion 9 includes a trigger switch 21 and a dial switch 22. The trigger switch 21 is used to adjust an amount of the air discharged from the blower 1. The dial switch 22 is used to set a maximum discharge amount of the air discharged from the blower 1.

Figure 2:
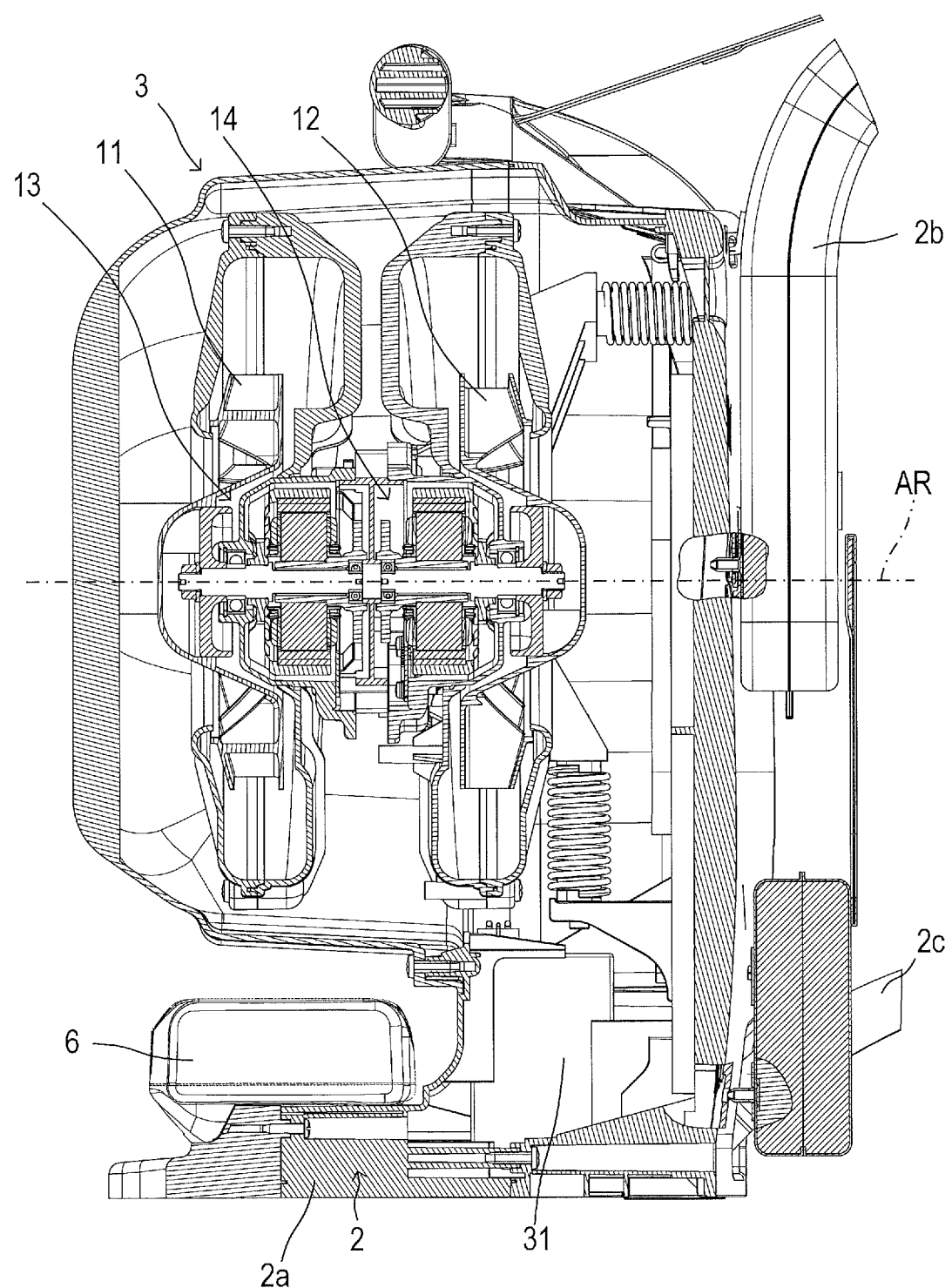
FIG. 2 is a sectional view of a blower main body.

As shown in FIG. 2, the blower main body 3 includes a first fan 11 and a second fan 12. The first fan 11 and the second fan 12 rotate around the common rotation axis AR. This allows the first fan 11 and the second fan 12 to introduce the air from both end sides of the rotation axis AR and to send the introduced air in the same direction.

The first fan 11 and the second fan 12 respectively include a first motor 13 and a second motor 14. In this embodiment, each of the first motor 13 and the second motor 14 may be, but not limited to, an outer-rotor brushless motor. The first fan 11 is fixed to a rotor of the first motor 13. The second fan 12 is fixed to a rotor of the second motor 14.

The first motor 13 has a structure identical to a structure of the second motor 14. The first motor 13 is arranged to face opposite to the second motor 14. Each of the first motor 13 and the second motor 14 is driven to rotate in a mutually reverse direction. This allows the first motor 13 and the second motor 14 to rotate around the rotation axis AR in the same direction. Thus, the first fan 11 and the second fan 12 can introduce the outside air from the both end sides of the rotation axis AR.

Figure 3:
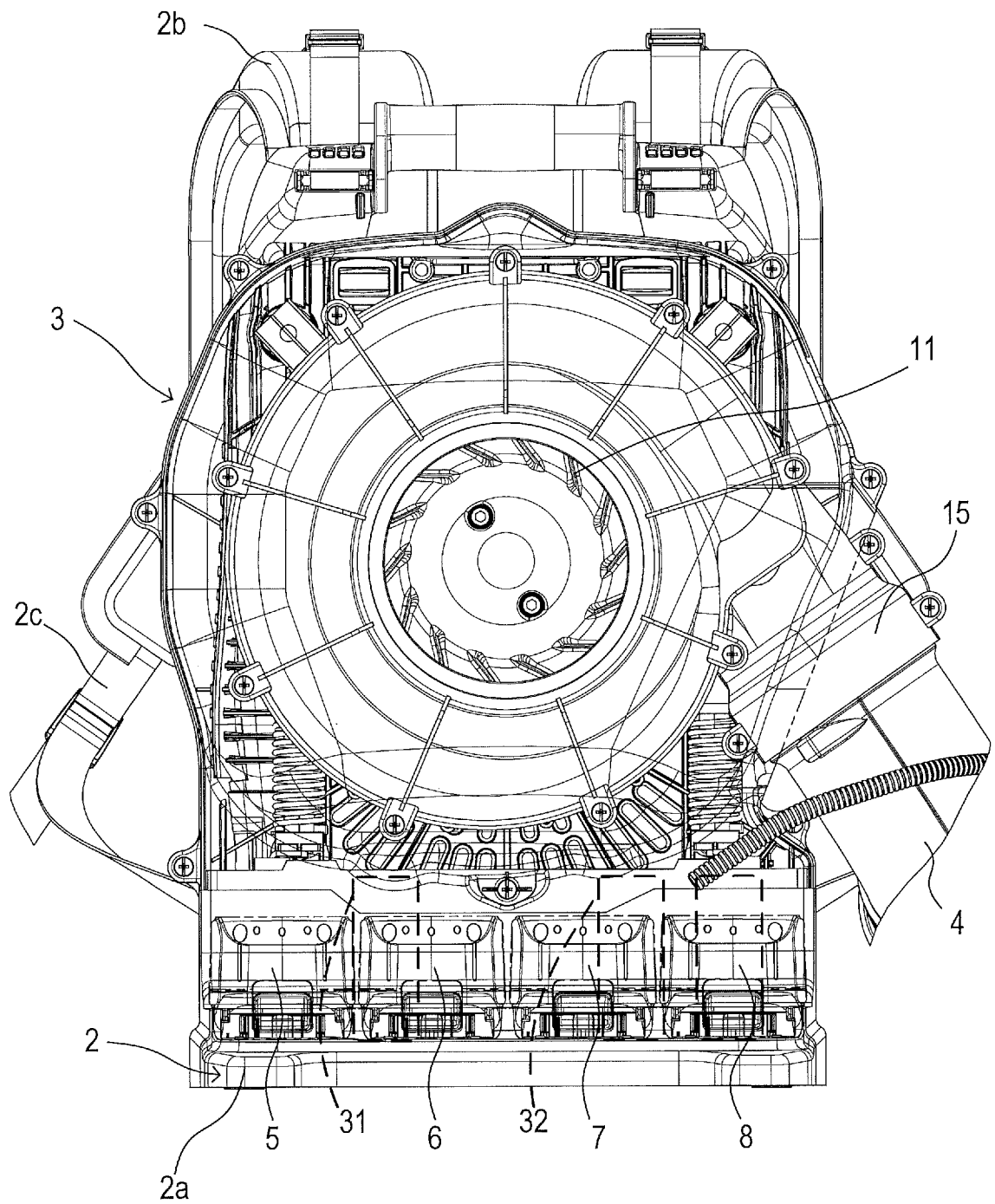
FIG. 3 is a front view of the blower main body showing an internal configuration of the blower main body.

As shown in FIG. 3, the blower main body 3 includes a pipe attachment portion 15 to which the pipe 4 is attached. The air sent from the first fan 11 and the second fan 12 is discharged from the pipe attachment portion 15 to an outside of the blower main body 3 and sent to an inside of the pipe 4.

The blower 1 further includes a first battery pack 5, a second battery pack 6, a third battery pack 7, and a fourth battery pack 8. These battery packs 5 to 8 are mounted on the loading portion 2a of the back carrier 2. The first battery pack 5 and the second battery pack 6 are direct-current power sources to drive the first motor 13. The first battery pack 5 and the second battery pack 6 respectively generate a first power supply voltage VB1 and a second power supply voltage VB2. The third battery pack 7 and the fourth battery pack 8 are direct-current power sources to drive the second motor 14. The third battery pack 7 and the fourth battery pack 8 respectively generate a third power supply voltage VB3 and a fourth power supply voltage VB4.

The blower 1 includes a first drive controller 31 and a second drive controller 32. The first drive controller 31 controls and drives the first motor 13. The second drive controller 32 controls and drives the second motor 14. Hereinafter, the first drive controller 31, the first battery pack 5, and the second battery pack 6 are collectively referred to as a first voltage supplier 35. Also, the second drive controller 32, the third battery pack 7, and the fourth battery pack 8 are collectively referred to as a second voltage supplier 36.

Figure 4:
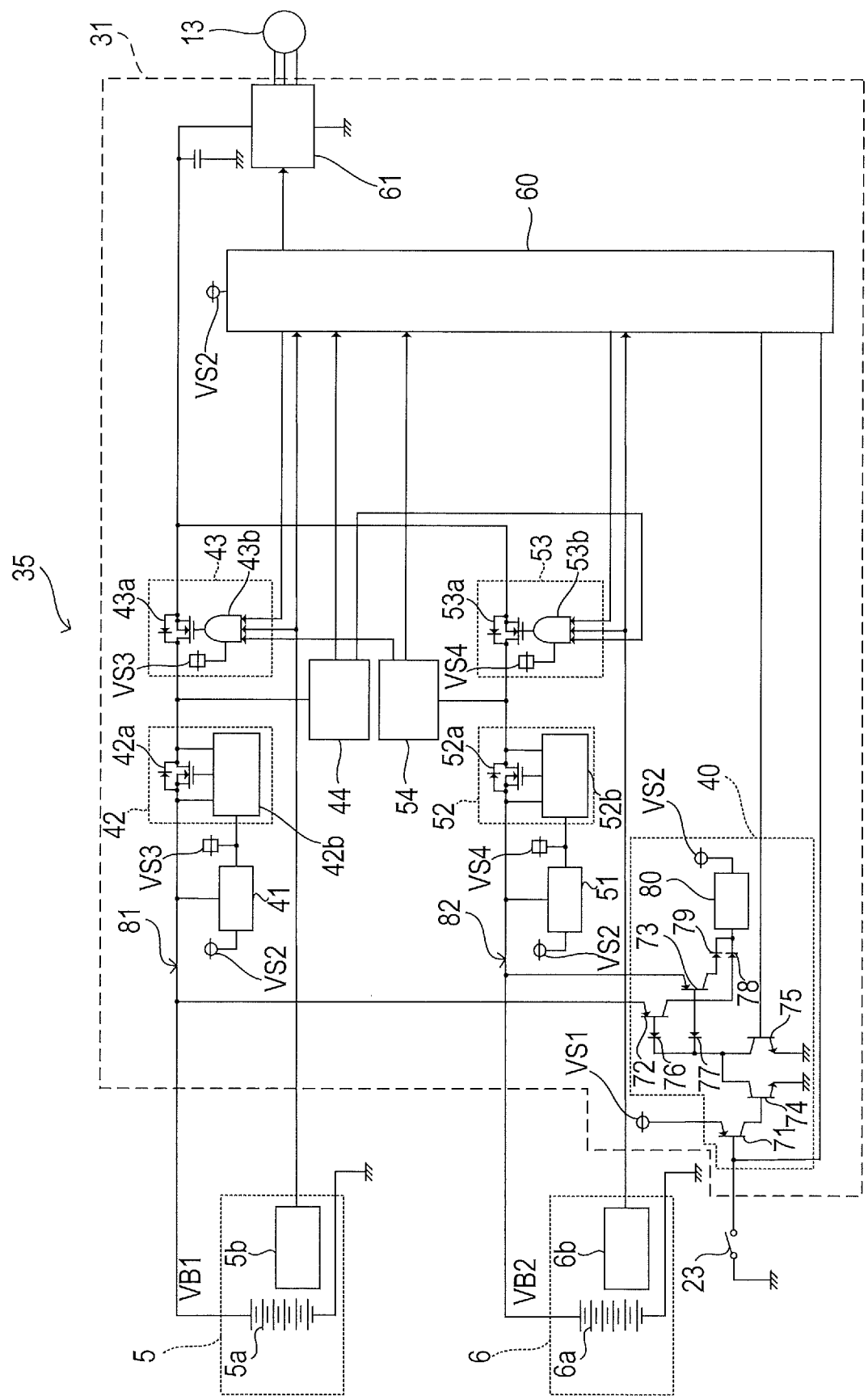
FIG. 4 is a circuit diagram showing a configuration of a first voltage supplier.

As shown in FIG. 4, the first drive controller 31 includes a voltage generation part 40, a first booster circuit 41, a first charge inhibition circuit 42, a first battery switching circuit 43, a first failure detection circuit 44, a second booster circuit 51, a second charge inhibition circuit 52, a second battery switching circuit 53, a second failure detection circuit 54, a microcomputer 60, and a motor driving circuit 61.

The voltage generation part 40 includes a first transistor 71, a second transistor 72, a third transistor 73, a fourth transistor 74, a fifth transistor 75, a first diode 76, a second diode 77, a third diode 78, a fourth diode 79, and a power supply circuit 80. The first to third transistors 71 to 73 are PNP-type bipolar transistors. The fourth transistor 74 and the fifth transistor 75 are NPN-type bipolar transistors.

A first direct current power supply voltage VS1 is applied to an emitter of the first transistor 71. The first direct current power supply voltage VS1 is generated by a power supply circuit (not shown) that receives power from the first battery pack 5 and the second battery pack 6. A base of the first transistor 71 is coupled to a first contact of a main power switch 23 located on the operating portion 9, and to the microcomputer 60. A second contact of the main power switch 23 is coupled to a ground. A collector of the first transistor 71 is coupled to a base of the fourth transistor 74.

An emitter of the second transistor 72 is coupled to a positive electrode of a rechargeable battery 5a included in the first battery pack 5. A base of the second transistor 72 is coupled to an anode of the first diode 76. A collector of the second transistor 72 is coupled to an anode of the third diode 78.

An emitter of the third transistor 73 is coupled to a positive electrode of a rechargeable battery 6a included in the second battery pack 6. A base of the third transistor 73 is coupled to an anode of the second diode 77. A collector of the third transistor 73 is coupled to an anode of the fourth diode 79.

A collector of the fourth transistor 74 is coupled to a cathode of the first diode 76, a cathode of the second diode 77, and a collector of the fifth transistor 75. An emitter of the fourth transistor 74 is coupled to the ground. A base of the fifth transistor 75 is coupled to the microcomputer 60. An emitter of the fifth transistor 75 is coupled to the ground. A cathode of the third diode 78 and a cathode of the fourth diode 79 are coupled to the power supply circuit 80.

In the voltage generation part 40 configured as described above, in response to the main power switch 23 being switched from OFF to ON, a voltage at the base of the first transistor 71 becomes the same as a ground voltage (that is, a reference potential), and the first transistor 71 is turned ON. This applies the first direct current power supply voltage VS1 to the base of the fourth transistor 74, and the fourth transistor 74 is turned ON.

In response to the fourth transistor 74 being turned ON, a voltage at the base of the second transistor 72 and a voltage at the base of the third transistor 73 become the same as the ground voltage, and the second transistor 72 and the third transistor 73 are turned ON. This allows the first power supply voltage VB1 of the first battery pack 5 and/or the second power supply voltage VB2 of the second battery pack 6 to be input into the power supply circuit 80. By use of the first power supply voltage VB1 and/or the second power supply voltage VB2, the power supply circuit 80 generates a second direct current power supply voltage VS2 to operate the first booster circuit 41, the second booster circuit 51 and the microcomputer 60.

Through a wiring coupling the first contact of the main power switch 23 to the microcomputer 60, the ground voltage is applied to the microcomputer 60. This allows the microcomputer 60 to recognize that the main power switch 23 is switched from OFF to ON. Then, the microcomputer 60 outputs a power maintaining signal to the fifth transistor 75 through a wiring coupling the base of the fifth transistor 75 to the microcomputer 60. This turns ON the fifth transistor 75.

In response to the fifth transistor 75 being turned ON, the voltage at the base of the second transistor 72 and the voltage at the base of the third transistor 73 becomes the same as the ground voltage, and the second transistor 72 and the third transistor 73 are turned ON. This allows the first power supply voltage VB1 and the second power supply voltage VB2 to be input into the power supply circuit 80 even when (even after) the main power switch 23 is switched from ON to OFF. Thus, the power supply circuit 80 maintains generating the second direct current power supply voltage VS2.

The first booster circuit 41 is driven by an input of the second direct current power supply voltage VS2. The first booster circuit 41 boosts the first power supply voltage VB1 to thereby generate a first boosted voltage VS3 to activate the first charge inhibition circuit 42 and the first battery switching circuit 43. In the present embodiment, the first booster circuit 41 may be, but not limited to, a charge pump.

The first charge inhibition circuit 42 may include a first metal oxide semiconductor field-effect transistor (MOSFET) 42a and a first synchronous rectifier circuit 42b.

The first MOSFET 42a is an N-channel type. A drain of the first MOSFET 42a is coupled to the first battery switching circuit 43. A source of the first MOSFET 42a is coupled to the positive electrode of the rechargeable battery 5a. The first synchronous rectifier circuit 42b is coupled to the drain, the source and a gate of the first MOSFET 42a.

The first synchronous rectifier circuit 42b turns ON the first MOSFET 42a when a voltage at the drain is equal to or less than a voltage at the source in the first MOSFET 42a. Thus, in response to a discharge current flowing from the first battery pack 5, the first MOSFET 42a is turned ON and the discharge current flows through the first MOSFET 42a with low loss. On the other hand, the first synchronous rectifier circuit 42b turns off the first MOSFET 42a in response to the voltage at the drain being higher than the voltage at the source in the first MOSFET 42a. Thus, in response to a charge current flowing into the first battery pack 5, the first MOSFET 42a is turned OFF. Accordingly, the unintentional charging of the first battery pack 5 is reduced or inhibited.

The first battery switching circuit 43 includes a second MOSFET 43a and a first logical product operation circuit 43b (hereinafter, referred to as a first AND gate 43b).

The second MOSFET 43a is the N-channel type. A drain of the second MOSFET 43a is coupled to the drain of the first MOSFET 42a. A source of the second MOSFET 43a is coupled to the motor driving circuit 61.

The first AND gate 43b receives a first normality signal, a first permission signal, and a second circuit state signal, and outputs a first output signal indicating a logical product of these signals to a gate of the second MOSFET 43a. The first AND gate 43b is supplied with the first boosted voltage VS3. Thus, the first output signal from the first AND gate 43b can have a voltage corresponding to the first boosted voltage VS3 when the output signal has a high-level voltage.

The first normality signal is output from a first abnormality detection circuit 5b included in the first battery pack 5. The first normality signal is a two-level signal that has the high-level voltage when the first battery pack 5 is normal, and has the low-level voltage when the first battery pack 5 is abnormal. The first abnormality detection circuit 5b, for example, determines that the first battery pack 5 is abnormal when remaining energy of the first battery pack 5 decreases to a specified threshold. The first permission signal is output from the microcomputer 60, and is HI (a high level voltage) when permission is granted. The second circuit state signal is output from the second failure detection circuit 54, and is HI (a high level voltage) when no failure is detected.

The first failure detection circuit 44 determines if there is a failure in the first charge inhibition circuit 42 and/or the first battery switching circuit 43. When determining that there is a failure in the first charge inhibition circuit 42 and/or the first battery switching circuit 43, the first failure detection circuit 44 outputs a first circuit failure signal indicating the failure in the first charge inhibition circuit 42 and/or the first battery switching circuit 43 to the microcomputer 60.

The first failure detection circuit 44 determines if the first MOSFET 42a of the first charge inhibition circuit 42 and/or the second MOSFET 43a of the first battery switching circuit 43 are ON, and then outputs a first circuit state signal indicating the determination result to the second battery switching circuit 53. Specifically, when determining that the first MOSFET 42a and/or the second MOSFET 43a is ON, the first failure detection circuit 44 outputs the first circuit state signal having the low-level voltage. When determining that the first MOSFET 42a and the second MOSFET 43a are OFF, the first failure detection circuit 44 outputs the first circuit state signal having the high-level voltage.

The second booster circuit 51 is driven by an input of the second direct current power supply voltage VS2. The second booster circuit 51 boosts the second power supply voltage VB2 to thereby generate a second boosted voltage VS4 to activate the second charge inhibition circuit 52 and the second battery switching circuit 53. In the present embodiment, the second booster circuit 51 may be, but not limited to, a charge pump.

The second charge inhibition circuit 52 includes a third MOSFET 52a and a second synchronous rectifier circuit 52b.

The third MOSFET 52a is the N-channel type. A drain of the third MOSFET 52a is coupled to the second battery switching circuit 53. A source of the third MOSFET 52a is coupled to a positive electrode of the rechargeable battery 6a. The second synchronous rectifier circuit 52b is coupled to the drain, the source and a gate of the third MOSFET 52a.

The second synchronous rectifier circuit 52b turns ON the third MOSFET 52a in response to a voltage at the drain of the third MOSFET 52a being equal to or less than a voltage at the source of the third MOSFET 52a. Thus, in response to a discharge current flowing from the second battery pack 6, the third MOSFET 52a is turned ON and the discharge current flows through the third MOSFET 52a with low loss. On the other hand, the second synchronous rectifier circuit 52b turns off the third MOSFET 52a in response to the voltage at the drain of the third MOSFET 52a being higher than the voltage at the source of the third MOSFET 52a. Thus, in response to a charge current flowing into the second battery pack 6, the third MOSFET 52a is turned OFF, which reduces or inhibits the charge of the second battery pack 6.

The second battery switching circuit 53 includes a fourth MOSFET 53a, a second logical product operation circuit 53b (hereinafter, referred to as a second AND gate 53b).

The fourth MOSFET 53a is the N-channel type. A drain of the fourth MOSFET 53a is coupled to a drain of the third MOSFET 52a. A source of the fourth MOSFET 53a is coupled to the motor driving circuit 61.

The second AND gate 53b receives a second normality signal, a second permission signal, and the first circuit state signal, and outputs an output signal indicating a logical product of these signals to a gate of the fourth MOSFET 53a. The second AND gate 53b is supplied with the second boosted voltage VS4. Therefore, the output signal from the second AND gate 53b can have a voltage corresponding to the second boosted voltage VS4 when the output signal has the high-level voltage.

The second normality signal is output from a second abnormality detection circuit 6b included in the second battery pack 6. The second normality signal is the two-level signal that has the high-level voltage when the second battery pack 6 is normal, and has the low-level voltage when the second battery pack 6 is abnormal. The second abnormality detection circuit 6b, for example, determines that second battery pack 6 is abnormal when remaining energy of the second battery pack 6 decreases to a specified threshold. The second permission signal is output from the microcomputer 60. The first circuit state signal is output from the first failure detection circuit 44.

The second failure detection circuit 54 determines if there is a failure in the second charge inhibition circuit 52 and/or the second battery switching circuit 53. When determining that there is a failure in the second charge inhibition circuit 52 and/or the second battery switching circuit 53, the second failure detection circuit 54 outputs a second circuit failure signal indicating the failure in the second charge inhibition circuit 52 and/or the second battery switching circuit 53 to the microcomputer 60.

The second failure detection circuit 54 determines if the third MOSFET 52a of the second charge inhibition circuit 52 and/or the fourth MOSFET 53a of the second battery switching circuit 53 are ON, then outputs the second circuit state signal indicating the determination result to the first battery switching circuit 43. Specifically, when determining that the third MOSFET 52a and/or the fourth MOSFET 53a is ON, the second failure detection circuit 54 outputs the second circuit state signal having the low-level voltage. When determining that the third MOSFET 52a and/or the fourth MOSFET 53a is OFF, the second failure detection circuit 54 outputs the second circuit state signal having the high-level voltage.

The microcomputer 60 includes CPU, ROM and RAM. Various functions of the microcomputer 60 can be achieved by CPU executing a program stored in a non-transitory tangible storage medium. In this example, the ROM corresponds to an example of the non-transitory tangible storage medium storing the program. Also, in response to the program being executed, a method corresponding to the program is performed. A part or all of the functions performed by the CPU may be achieved by a hardware including at least one Integrated Circuit (IC).

The microcomputer 60 outputs a motor drive signal for controlling and driving the first motor 13 to the motor driving circuit 61.

The motor driving circuit 61 includes a three-phase bridge circuit having six switching devices (not shown). The motor driving circuit 61 outputs three-phase alternating voltages of U-PHASE, V-PHASE and W-PHASE to the first motor 13 based on the motor drive signal received from the microcomputer 60.

Figure 5:
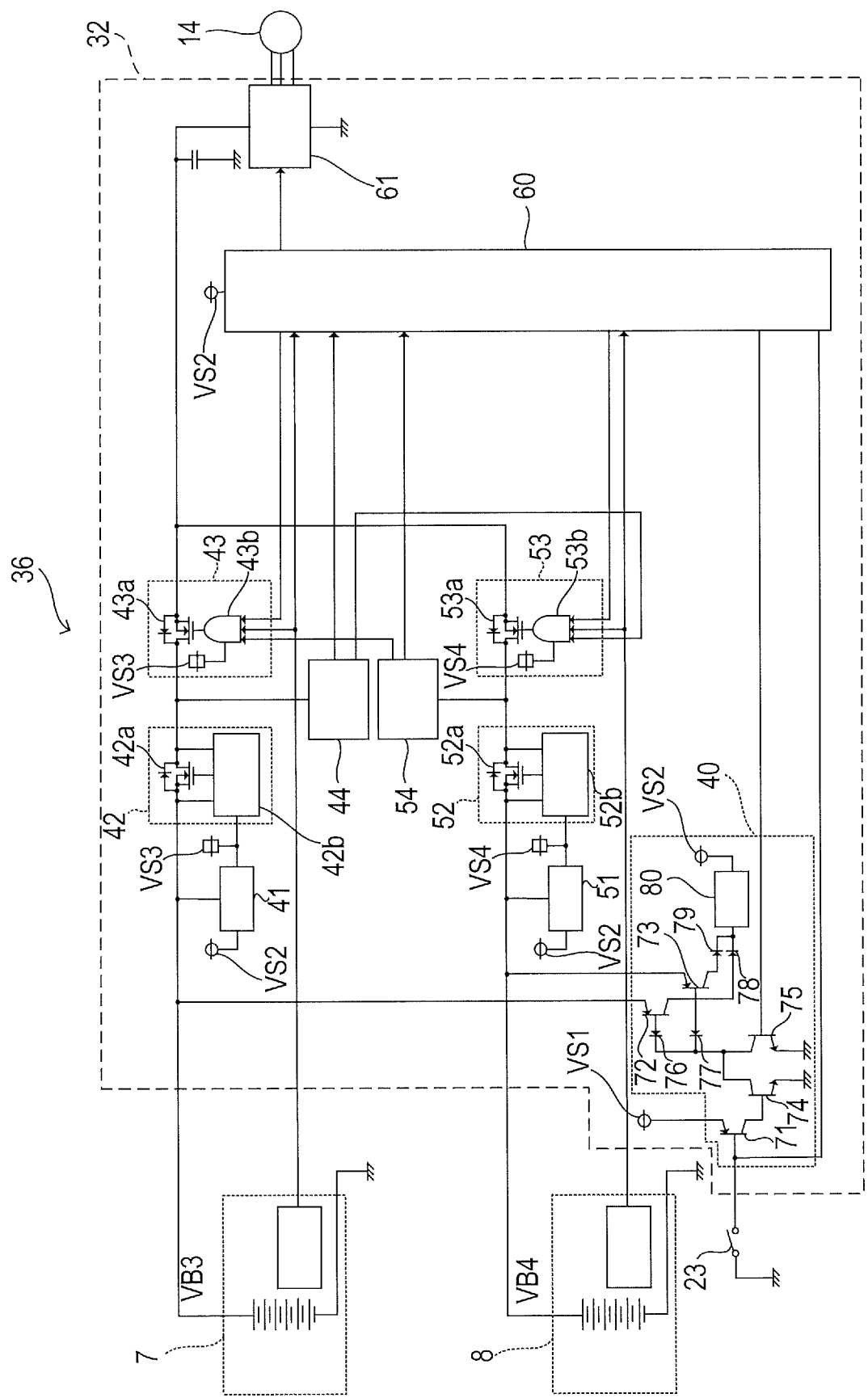
FIG. 5 is a circuit diagram showing a configuration of a second voltage supplier.

As shown in FIG. 5, the second drive controller 32 is configured substantially same as the first drive controller 31 except that the third battery pack 7, the fourth battery pack 8 and the second motor 14 are coupled instead of the first battery pack 5, the second battery pack 6 and the first motor 13.

A procedure of a discharge control process executed by the microcomputer 60 (more specifically, executed by the CPU of the microcomputer 60). In response to the microcomputer 60 being activated, the microcomputer 60 starts the discharge control process.

Figure 6:
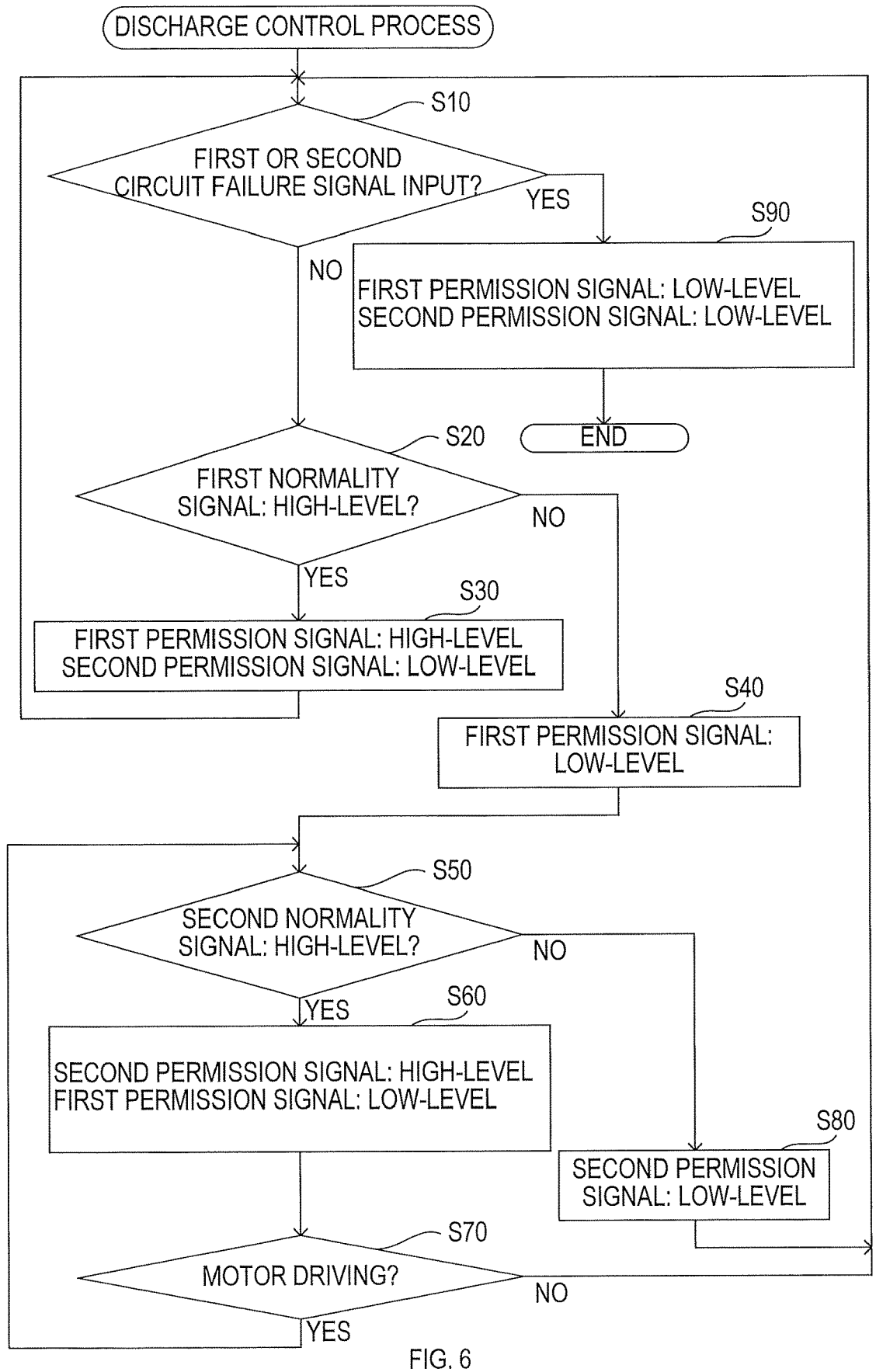
FIG. 6 is a flowchart showing a discharge control process.

As shown in FIG. 6, in response to the discharge control process being executed, the microcomputer 60 first determines if the first circuit failure signal or the second circuit failure signal is input (S10). Here, when the first circuit failure signal and second circuit failure signal are not input (S10: NO), then the microcomputer 60 determines if the first normality signal received by the microcomputer 60 has the high-level voltage (S20).

When the first normality signal has the high-level voltage (S20: YES), the microcomputer 60 sets the high-level voltage for the first permission signal, and sets the low-level voltage for the second permission signal (S30), and then the process goes back to the S10. Thus, the microcomputer 60 outputs the first permission signal having the high-level voltage, and the second permission signal having the low-level voltage.

On the other hand, when the first normality signal has the low-level voltage (S20: NO), the microcomputer 60 sets the low-level voltage for the first permission signal (S40), and the process goes on to S50. Thus, the microcomputer 60 outputs the first permission signal having the low-level voltage.

In the S50, the microcomputer 60 determines if the second normality signal received by the microcomputer 60 has the high-level voltage (normal indication) or not (abnormal indication). When the second normality signal has the high-level voltage (S50: YES), the microcomputer 60 sets the high-level voltage for the second permission signal and sets the low-level voltage for the first permission signal (S60). Thus, the microcomputer 60 outputs the second permission signal having the high-level voltage, and outputs the first permission signal having the low-level voltage.

Next, in S70, the microcomputer 60 determines if the motor (that is, the first motor 13 or the second motor 14) coupled to the microcomputer 60 via the motor driving circuit 61 is driving. When the motor is driving (S70: YES), the process goes back to the S50. On the other hand, when the motor is not driving (S70: NO), the process goes back to the S10.

In the S50, when the second normality signal has the low-level voltage (S50: NO), the microcomputer 60 sets the low-level voltage for the second permission signal (S80), and the process goes back to the S10. Thus, the microcomputer 60 outputs the second permission signal having the low-level voltage.

In the S10, when the first circuit failure signal or the second circuit failure signal is input (S10: YES), the microcomputer 60 sets the low-level voltage for both the first permission signal and the second permission signal (S90), and the discharge control process ends. Thus, the microcomputer 60 outputs the first permission signal having the low-level voltage, and outputs the second permission signal having the low-level voltage.

The blower 1 configured as described above includes the first voltage supplier 35 and the second voltage supplier 36.

The first voltage supplier 35 includes the first battery pack 5, the second battery pack 6, the first battery switching circuit 43, the second battery switching circuit 53, the first booster circuit 41, and the second booster circuit 51. The first battery pack 5 generates the first power supply voltage VB1 to drive the first motor 13 of the backpack-type blower 1. The second battery pack 6 generates the second power supply voltage VB2 to drive the first motor 13.

The first battery switching circuit 43 is arranged on a first supply path 81 supplying the first power supply voltage VB1 from the first battery pack 5 to the motor driving circuit 61. The first battery switching circuit 43 switches the first supply path 81 to an electrically interrupted state or an electrically coupled state. The second battery switching circuit 53 is arranged on a second supply path 82 supplying the second power supply voltage VB2 from the second battery pack 6 to the motor driving circuit 61. The second battery switching circuit 53 switches the second supply path 82 to the electrically interrupted state or the electrically coupled state. The term of "electrically interrupted state" includes not only a state where no electric current flows between the first battery pack 5 or the second battery pack 6 and the motor driving circuit 61, but also a state where a leakage current flows between the first battery pack 5 or the second battery pack 6 and the motor driving circuit 61 through the second MOSFET 43a or the fourth MOSFET 53a.

The first booster circuit 41 boosts the first power supply voltage VB1 that is lower than the first boosted voltage VS3, thereby generating the first boosted voltage VS3 to be supplied to the first battery switching circuit 43. The second booster circuit 51 boosts the second power supply voltage VB2 that is lower than the second boosted voltage VS4, thereby generating the second boosted voltage VS4 to be supplied to the second battery switching circuit 53.

As described above, in the first voltage supplier 35, the first booster circuit 41 supplies the first boosted voltage VS3 to the first battery switching circuit 43, and the second booster circuit 51 supplies the second boosted voltage VS4 to the second battery switching circuit 53. Thus, in the first voltage supplier 35, the first supply path 81 is configured not to be electrically coupled to the second supply path 82 through the first booster circuit 41. Similarly, in the first voltage supplier 35, the second supply path 82 is configured not to be electrically coupled to the first supply path 81 through the second booster circuit 51. Therefore, the first voltage supplier 35 can reduce the occurrence of the charge from the first battery pack 5 to the second battery pack 6, and reduce the occurrence of the charge from the second battery pack 6 to the first battery pack 5.

Further, in the first voltage supplier 35, the first booster circuit 41 generates the first boosted voltage VS3 by boosting the first power supply voltage VB1 supplied from the first battery pack 5, and the second booster circuit 51 generates the second boosted voltage VS4 by boosting the second power supply voltage VB2 supplied from the second battery pack 6.

Thus, in the first voltage supplier 35, when the first battery pack 5 cannot generate the first power supply voltage VB1, the second power supply voltage VB2 can be supplied from the second battery pack 6 through the second supply path 82. In addition, in the first voltage supplier 35, when the second battery pack 6 cannot generate the second power supply voltage VB2, the first power supply voltage VB1 can be supplied from the first battery pack 5 through the first supply path 81.

In the above-described embodiment, the first voltage supplier 35 and the second voltage supplier 36 correspond to one example of the voltage supplier of the present disclosure. The first motor 13, the second motor 14 and the motor driving circuit 61 correspond to one example of the drive source of the present disclosure. Each of the first battery pack 5 and the third battery pack 7 corresponds to one example of the first voltage generator of the present disclosure. Each of the second battery pack 6 and the fourth battery pack 8 corresponds to one example of the second voltage generator of the present disclosure.

Also, the first battery switching circuit 43 corresponds to one example of the first switcher of the present disclosure. The second battery switching circuit 53 corresponds to one example of the second switcher of the present disclosure. The first booster circuit 41 corresponds to one example of the first booster of the present disclosure. The second booster circuit 51 corresponds to one example of the second booster of the present disclosure.

Further, the first power supply voltage VB1 and the third power supply voltage VB3 correspond to one example of the first power supply voltage of the present disclosure. The second power supply voltage VB2 and the fourth power supply voltage VB4 correspond to one example of the second power supply voltage of the present disclosure. The first boosted voltage VS3 corresponds to one example of the first switching drive voltage of the present disclosure. The second boosted voltage VS4 corresponds to one example of the second switching drive voltage of the present disclosure.

The second MOSFET 43a corresponds to one example of the first switching device of the present disclosure, and the fourth MOSFET 53a corresponds to one example of the second switching device of the present disclosure.

Although one embodiment of the present disclosure has been explained above, the present disclosure may be implemented in various forms without being limited to the above embodiment.

For example, in the above embodiment, each of the first voltage supplier 35 and the second voltage supplier 36 includes two battery packs. However, the first voltage supplier 35 and/or the second voltage supplier 36 may include three or more battery packs.

In the above embodiment, each of the first booster circuit 41 and the second booster circuit 51 is the charge pump. However, the first booster circuit 41 and/or the second booster circuit 51 may be a boost converter, a back-boost converter or the like.

Figure 7:
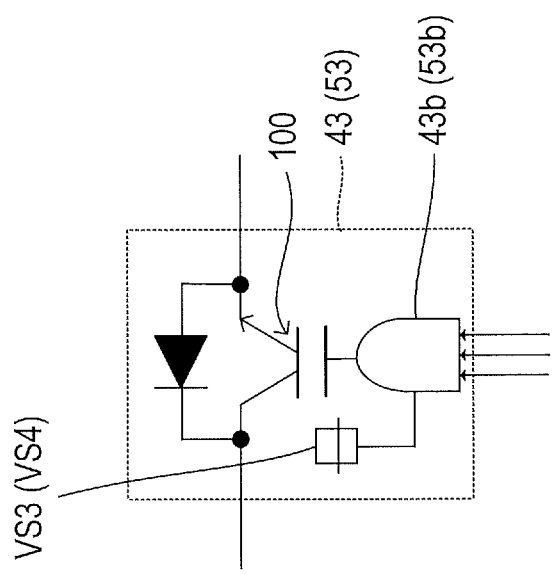
FIG. 7 is a circuit diagram showing a modified battery switching circuit.

In the above embodiment, each of the first battery switching circuit 43 and the second battery switching circuit 53 includes the N-channel MOSFET. However, as shown in FIG. 7, the first battery switching circuit 43 and/or the second battery switching circuit 53 may include an insulated gate type bipolar transistor (IGBT) 100 instead of the N-channel MOSFET.

The technique of the present disclosure may be applied to various electric working machines such as machineries for gardening besides the backpack-type blower, and electric power tools for stone processing, metal processing, wood processing and the like. More specifically, the technique of the present disclosure may be applied to various electric working machines such as electric hammers, electric hammer drills, electric drills, electric drivers, electric wrenches, electric grinders, electric circular saws, electric reciprocating saws, electric jigsaws, electric cutters, electric chain saws, electric planes, electric nail guns (including tackers), electric hedge trimmers, electric lawn mowers, electric grass trimmers, electric weed whackers, electric cleaners, electric sprayers, electric spreaders, and electric dust collectors.

Functions of one component in the above embodiment may be achieved by two or more components, and one function of two or more components may be achieved by one component. In addition, a part of the configuration in the above embodiment may be omitted. Further, at least a part of the configuration in the above embodiment may be added to or replaced with other configuration in the above embodiment. It should be noted that any modes within the technical idea specified by the language of the claims are embodiments of the present disclosure.

What is claimed is:

1. A blower comprising:
   a fan;
   a motor configured to drive the fan;
   a motor driving circuit configured to drive the motor;
   a first supply path configured to supply a first power supply voltage from a positive electrode of a first battery pack to the motor driving circuit;
   a first booster circuit configured to:
      obtain the first power supply voltage from the first supply path; and
      boost the first power supply voltage to generate a first boosted voltage;
   a first battery switching circuit including a first N-channel Metal Oxide Semiconductor Field Effect Transistor (MOSFET) disposed on the first supply path, the first N-channel MOSFET including:
      a first drain coupled to the positive electrode of the first battery pack;
      a first source coupled to the motor driving circuit; and
      a first gate coupled to a first logical circuit that is configured to turn on the first N-channel MOSFET by supplying the first boosted voltage to the first gate based on two or more signals input to the first logical circuit;
   a second supply path configured to supply a second power supply voltage from a positive electrode of a second battery pack to the motor driving circuit;
   a second booster circuit configured to:
      obtain the second power supply voltage from the second supply path; and
      boost the second power supply voltage to generate a second boosted voltage; and
   a second battery switching circuit including a second N-channel MOSFET disposed on the second supply path, the second N-channel MOSFET including:
      a second drain coupled to the positive electrode of the second battery pack;
      a second source coupled to the motor driving circuit; and a second gate coupled to a second logical circuit that is configured to turn on the second N-channel MOSFET by supplying the second boosted voltage to the second gate based on two or more signals input to the second logical circuit.

2. An electric working machine comprising:
a motor;
a motor driving circuit configured to drive the motor;
a first supply path configured to supply a first power supply voltage from a positive electrode of a first battery pack to the motor driving circuit;
a first booster circuit configured to:
  obtain the first power supply voltage from the first supply path; and
  boost the first power supply voltage to generate a first boosted voltage;
a first battery switching circuit including a first switching device disposed on the first supply path, the first switching device including:
  a first terminal coupled to the first battery pack; and
  a second terminal coupled to the motor driving circuit, the first switching device being configured to electrically couple the positive electrode of the first battery pack to the motor driving circuit in response to the first switching device being turned ON, and the first battery switching circuit being configured to turn on the first switching device with the first boosted voltage in response to a first condition being established;
a second supply path configured to supply a second power supply voltage from a positive electrode of a second battery pack to the motor driving circuit;
a second booster circuit configured to:
  obtain the second power supply voltage from the second supply path; and
  boost the second power supply voltage to generate a second boosted voltage;
a second battery switching circuit including a second switching device disposed on the second supply path, the second switching device including:
  a first terminal coupled to the second battery pack; and
  a second terminal coupled to the motor driving circuit, the second switching device being configured to electrically couple the positive electrode of the second battery pack to the motor driving circuit in response to the second switching device being turned ON, and the second battery switching circuit being configured to turn on the second switching device with the second boosted voltage in response to a second condition being established; and
a first charge inhibition circuit configured to electrically interrupt the first terminal of the first switching device from the positive electrode of the first battery pack in response to a voltage at the first terminal of the first switching device being larger than a voltage at the positive electrode of the first battery pack.

3. The electric working machine according to claim 2, wherein the first condition is established in response to the following (i) to (iii) being satisfied:
  (i) the first battery pack is normal;
  (ii) an electric discharge from the first battery pack is permitted; and
  (iii) there is no failure in the first battery switching circuit and the first charge inhibition circuit.

4. The electric working machine according to claim 2, further comprising
  a second charge inhibition circuit configured to electrically interrupt the first terminal of the second switching device from the positive electrode of the second battery pack in response to a voltage at the first terminal of the second switching device being larger than a voltage at the positive electrode of the second battery pack.

5. The electric working machine according to claim 4, wherein the second condition is established in response to the following (i) to (iii) being satisfied:
  (i) the second battery pack is normal;
  (ii) an electric discharge from the second battery pack is permitted; and
  (iii) there is no failure in the second battery switching circuit and the second charge inhibition circuit.

6. The electric working machine according to claim 2, wherein the second terminal of the second switching device is electrically coupled to the second terminal of the first switching device.

7. The electric working machine according to claim 2, wherein the first switching device and/or the second switching device comprises an N-channel MOSFET.

8. The electric working machine according to claim 2, wherein the first switching device and/or the second switching device comprises an insulated gate bipolar transistor (IGBT).

* * * * *